(12) United States Patent
Young

(10) Patent No.: US 11,612,941 B2
(45) Date of Patent: Mar. 28, 2023

(54) SPEEDER DEVICE FOR INCREASING THE SPEED OF A WORKPIECE

(71) Applicant: ELTOOL CORPORATION, Mansfield, OH (US)

(72) Inventor: John Young, Mansfield, OH (US)

(73) Assignee: ELTOOL CORPORATION, Mansfield, OH (US)

(*) Notice: Subject to any disclaimer, the term of this patent is extended or adjusted under 35 U.S.C. 154(b) by 153 days.

(21) Appl. No.: 17/168,248

(22) Filed: Feb. 5, 2021

(65) Prior Publication Data
US 2022/0250160 A1    Aug. 11, 2022

(51) Int. Cl.
*B23B 1/00* (2006.01)
*B23B 7/02* (2006.01)

(52) U.S. Cl.
CPC . *B23B 7/02* (2013.01); *B23B 1/00* (2013.01)

(58) Field of Classification Search
CPC ... B23B 2260/07; B23B 2260/11; B23B 7/10; B23B 7/02; B23B 1/00; B23B 33/00; B23Q 2705/08; B23Q 2705/02; B23Q 2705/005; B23Q 5/18; B23Q 5/048; B23Q 2260/12
See application file for complete search history.

(56) References Cited

U.S. PATENT DOCUMENTS

| | | | |
|---|---|---|---|
| 4,620,824 A * | 11/1986 | Eckstein | B23Q 3/12 408/124 |
| 4,960,405 A * | 10/1990 | Katayama | B23Q 5/048 475/183 |
| 5,092,190 A * | 3/1992 | Kubo | B23Q 5/048 475/347 |
| 5,700,115 A * | 12/1997 | Chikamori | B23Q 5/048 408/233 |
| 5,711,739 A * | 1/1998 | Hashimoto | B23Q 5/048 475/263 |
| 5,862,705 A | 1/1999 | Lee | |
| 5,895,059 A | 4/1999 | Patterson | |
| 6,227,777 B1 | 5/2001 | Kosmowski | |
| 6,588,307 B2 | 7/2003 | Chen | |
| 7,070,363 B2 | 7/2006 | Long, II et al. | |
| 8,272,302 B2 | 9/2012 | Akiyama | |
| 9,511,460 B2 | 12/2016 | Baumann | |
| 10,328,540 B2 | 6/2019 | Chang | |
| 2019/0301571 A1* | 10/2019 | Tesar | F16H 3/66 |
| 2021/0172499 A1* | 6/2021 | Nino | B25F 5/001 |

* cited by examiner

*Primary Examiner* — Alan Snyder
(74) *Attorney, Agent, or Firm* — Renner, Kenner, Greive, Bobak, Taylor & Weber

(57) ABSTRACT

The present invention provides a lathe having a speeder device to increase the speed of a workpiece to be worked on by the lathe as compared to the speed of a workpiece to be worked on by the lathe without the use of the speeder device. The speeder device includes a torque arm, a means for stopping rotation of the torque arm, a planetary gearset assembly, an output spindle assembly, and a collet assembly. The means for stopping rotation of the torque rod is secured to a first end of the torque rod and the planetary gearset assembly is operatively connected to a second end of the torque rod. The output assembly is operatively connected to the planetary gear assembly, and the collet assembly holds the workpiece and is operatively connected to the spindle assembly.

15 Claims, 4 Drawing Sheets

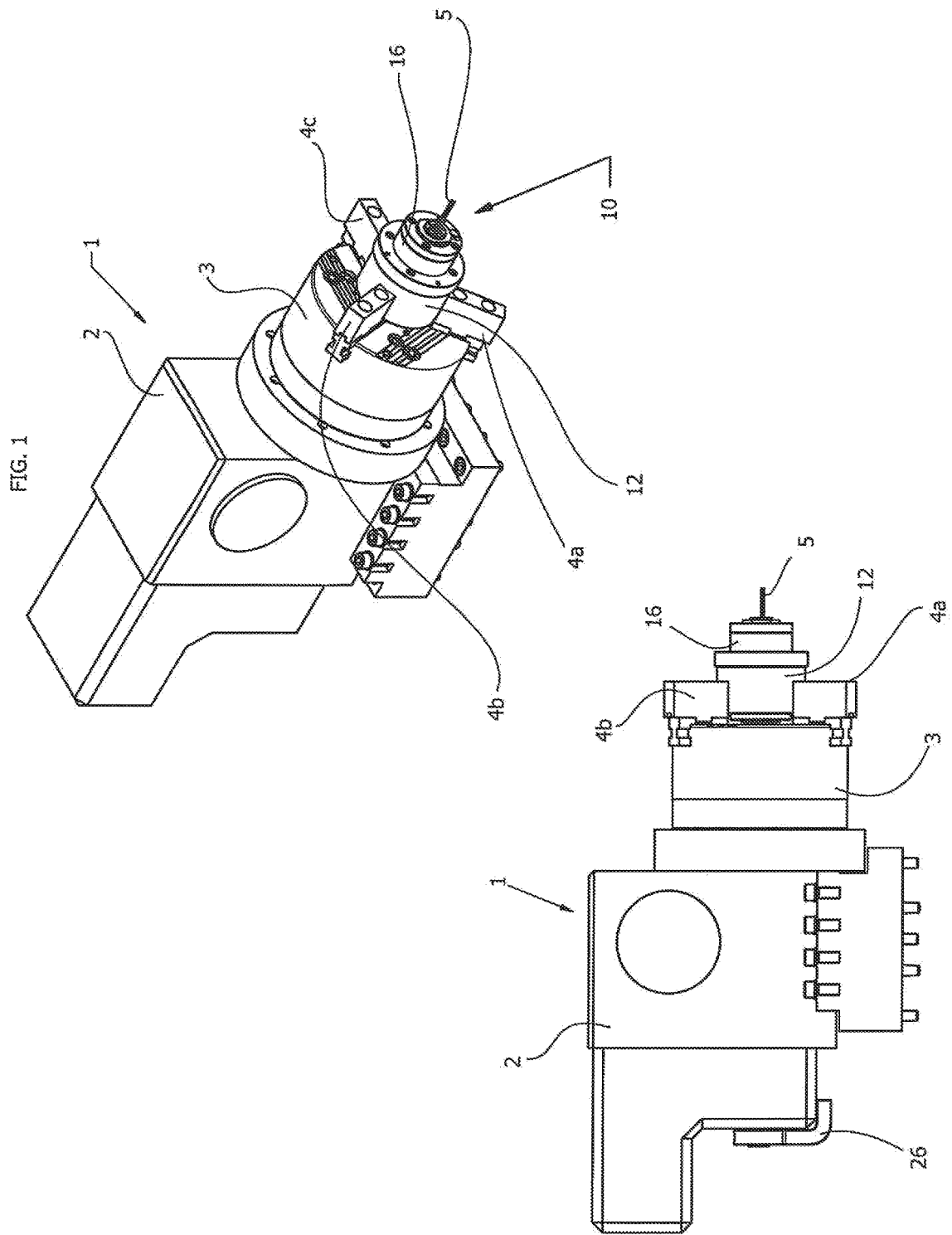

SPEEDER DEVICE FOR INCREASING THE SPEED OF A WORKPIECE

TECHNICAL FIELD

The invention herein relates to a speeder device to be attached to a lathe or the chuck of a lathe. More particularly, the invention relates to a speeder device attached to the lathe or chuck that provides for increasing the rotational speed of a workpiece held by the device. Specifically, the speeder device of the present invention provides for increasing the rotational speed of the workpiece by several (i.e., multiples revolutions per minute (RPMs) compared to the rotational speed of the lathe or chuck itself.

BACKGROUND OF THE INVENTION

A lathe is a machine tool that rotates a workpiece about an axis of rotation to perform various operations such as cutting, sanding, knurling, drilling, deformation, facing, and turning, with tools that are applied to the workpiece to create an object with symmetry about that axis. Often, lathes are used in combination with a lathe chuck which helps to hold the mounted workpiece. Lathe chucks are mounted on the spindle of a lathe. Computerized Numerical Control (CNC) lathes are more common today, meaning the work done by the CNC lathe is computerized based upon inputs into a computer as compared to conventional lathes that continue to operate manually.

Conventional lathes are still often used in woodturning, but CNC laths are more often used in metalworking, metal spinning, thermal spraying, parts reclamation, and glass working. Most suitably equipped CNC lathes can also be used to produce most solid figures, plane surfaces, and screw threads or helices. Such CNC lathes can produce three-dimensional solids of incredible complexity. The workpiece is usually held in place by either one or two centers, at least one of which can typically be moved horizontally to accommodate varying workpiece lengths. Other workpiece-holding methods include clamping the workpiece about the axis of rotation using a chuck or collet, or to a faceplate, using clamps or a dog clutch.

However, existing lathes, including CNC lathes have limitations when it comes to achieving the proper surface feet per minute (SFM) needed when machining small parts due to limitations regarding the revolutions per minute (RPM) of the spindle/chuck. Machining small parts can require more than 10,000 RPM to achieve a clean surface finish. However, setting existing lathes at or above 4,500 RPM can cause the entire machine to shake due to imbalances in the internal machine components. Therefore, there is a need in the art to operate a CNC lathe at a stable RPM but to actually turn the workpiece at a faster RPM of more than 10,000.

SUMMARY OF THE INVENTION

As least one aspect of the present invention provides a lathe having a speeder device to increase the speed, specifically, the rotational speed, of a workpiece. Increasing the rotational speed of the workpiece provides several advantages previously unavailable in the production of goods made on a lathe, and more particularly, on a CNC lathe. First, increasing the rotational speed of the workpiece on the lathe will increase the feed rate, usually calculated in surface feet per minute, used to cut the workpiece. This will, in turn, reduce the time it takes to turn the workpiece into a finished product.

Advantageously, increasing the speed of the workpiece also provides for a cleaner, smoother finish of the resultant product. Again, a rotational speed of at least 10,000 RPMs or more is necessary to provide a clean, smooth finish to some smaller workpieces, but ordinary CNC lathes just cannot maintain such speeds without destabilizing the product or the lathe itself.

Further, increasing the speed of the workpiece will extend the life of the tools used to cut the workpiece. Oftentimes, a CNC lathe cannot cut a workpiece at its proper feed rate in surface feet per minute. By increasing the speed of the workpiece, the tool can then cut the workpiece at is most efficient and effective rate.

Thus, it is one aspect of the present invention to provide a speeder device having a torque rod, means for stopping rotation of the torque rod secured to a first end of the torque rod, a planetary gearset assembly operatively connected to a second end of the torque rod, an output spindle assembly operatively connected to the planetary gearset assembly, and a collet assembly that holds the workpiece and is operatively connected to the output spindle assembly. The planetary gearset assembly includes a plurality of planet gears, a sun gear, and a ring gear. In some embodiments, the planet gears are contained within the planetary gearset assembly by a planet gear carrier, and in some embodiments, the torque rod may be connected to the planetary gear assembly at the planet gear carrier. Thus, the planetary gear carrier will also not rotate when attached to the torque rod.

Each planet gear of the plurality of planet gears has a plurality of teeth. The number of teeth of each planet gear does not really matter, but each planet gear should have a sufficient number of teeth to adequately and suitably rotate around the sun gear and to adequately rotate within the ring gear. In the present invention, the sun gear has a predetermined number (N) of teeth, wherein N is an integer between 8 and 50, and the ring gear has at least two times the number (2×N) of teeth of the sun gear. The plurality of teeth of each planet gear of the plurality of planet gears are in contact with the teeth of the sun gear and the teeth of the ring gear.

While it will be appreciated that any means for stopping rotation of the torque rod known in the art may be used in the present invention, in one or more embodiments, means for stopping rotation of the torque rod is a torque arm slidably received onto the torque rod and extending at least partially radially from the torque rod so as to provide an element that rests against a stationary element such as the lathe housing. In one or more other embodiments, the means for stopping rotation of the torque rod is an anti-rotating clamp which clamps around the torque rod and also extends at least partially radially from the torque rod so as to provide an element that rests against a stationary element such as the lathe housing.

In other embodiments, the planetary gearset assembly is contained within a gearbox housing. As noted above, the planetary gearset assembly further includes a planet gear carrier to carry the plurality of planet gears, a ring gear carrier to carry the ring gear, and a sun gear bearing to caner the sun gear. The ring gear carrier is connected to the gearbox housing such that one rotation of the gearbox housing causes one rotation of the ring gear carried by the ring gear carrier. In one embodiment, the ring gear carrier is the gearbox housing.

In yet other embodiments, the planetary gearset assembly also includes an input spider in operative connection with the planet gear carrier and to a rod bearing secured to the second end of the torque rod such that the planet gear carrier is operatively connected to the torque rod, The rod bearing allows tor the torque rod, input spider, and planet gear carrier to remain stationary, while the rest of the speeder device is permitted to turn/rotate.

In other embodiments, the output spindle assembly includes a spindle housing, a pair of spindle bearings, a spindle bearing cap and an output spindle. The spindle housing is secured to the gearbox housing. The spindle bearings sit within the spindle housing. The spindle bearing cap is secured to the spindle housing, and the output spindle sits within the spindle housing. It will be appreciated that the spindle bearing allows the output spindle to rotate faster than the gearbox housing or the ring gear, output spindle being operatively connected to the sun gear so as to rotate at the same speed.

In other embodiments, the collet assembly includes a collet and a collet nut, wherein the spindle carries the collet, wherein the collet holds the workpiece, and wherein the collet nut is used to tighten or loosen the collet around the workpiece.

In yet other embodiments, the planetary gear assembly further includes an output spider secured to the sun gear, wherein the output spindle assembly further includes a spindle spider operatively connected to the spindle, and wherein the output spider is connected to the spindle spider in order to transmit the rotation of the sun gear to the spindle. Thus, it will be appreciated that the sun gear rotates faster than the ring gear, which rotates at the same speed as the gearbox attached to the lathe or chuck, which rotates at a predetermined speed. The sun gear is then operatively connected to the output spindle (through the output spider and spindle spider), which in turn is operatively connected to the collet that holds workpiece. Thus, the workpiece will rotate at the same speed as the sun gear, which rotates at least twice as fast the lathe or chuck, and depending upon the number of teeth of the sun gear compared to the number of teeth of the ring gear will rotate several times faster than the lathe.

In yet other embodiment, the lathe further includes a lathe chuck secured to the lathe and wherein the speeder device is connected to the lathe chuck through the use of chuck jaws.

It is yet another aspect of the present invention to provide a method to increase the speed in revolutions per minute (RPM) of a workpiece to be worked on by a lathe, especially a CNC lathe. The method may include the steps of: operatively securing a speeder device to the lathe, securing the workpiece to a collet assembly of the speeder device, and operating the lathe at an RPM to define a lathe RPM. The speeder device comprises a planetary gearset assembly, a spindle assembly, and the collet assembly. The planetary gearset assembly includes: a plurality of planet gears wherein each planet gear of the plurality of planet gears has a plurality of teeth; a sun gear having a number (N) of teeth, wherein N is an integer between 8 and 50; and a ring gear having at least twice the number (essentially 2N) of teeth as compared to the sun gear. The plurality of teeth of each planet gear of the plurality of planet gears are in contact with the teeth of the sun gear and the teeth of the ring gear. The ring gear rotates at the lathe RPM, wherein the sun gear rotates faster at an RPM to define a sun gear RPM. The sun gear RPM is greater than the lathe RPM by a gear ratio, and the gear rate is determined by the number of teeth of the ring gear divided by the number of teeth of the sun gear, i.e., the gear ratio, plus 1. The sun gear is operatively connected to the workpiece such that the speed of the workpiece will be increased to the sun gear RPM.

In one or more embodiments, the step of operatively securing the speeder device further includes the step of operatively securing a lathe chuck to the lathe and then operatively securing the speeder device to the lathe chuck. Alternatively, the speeder device can become the lathe chuck itself and be attached directly to the lathe spindle.

In other embodiments, the step of operatively securing the speeder device further includes the step of inserting a torque rod of the speeder device through a lathe spindle of the lathe and securing means for stopping rotation of said torque rod to a first end of said torque rod.

DESCRIPTION OF DRAWINGS

For a complete understanding of the various aspects, structures and operation of the invention, reference should be made to the following detailed description and accompanying drawings wherein:

FIG. 1 is a perspective side view of a representative embodiment of a CNC lathe including a speeder device of the present invention;

FIG. 2 is a side elevational view of the CNC lathe of FIG. 1;

Figure 3:
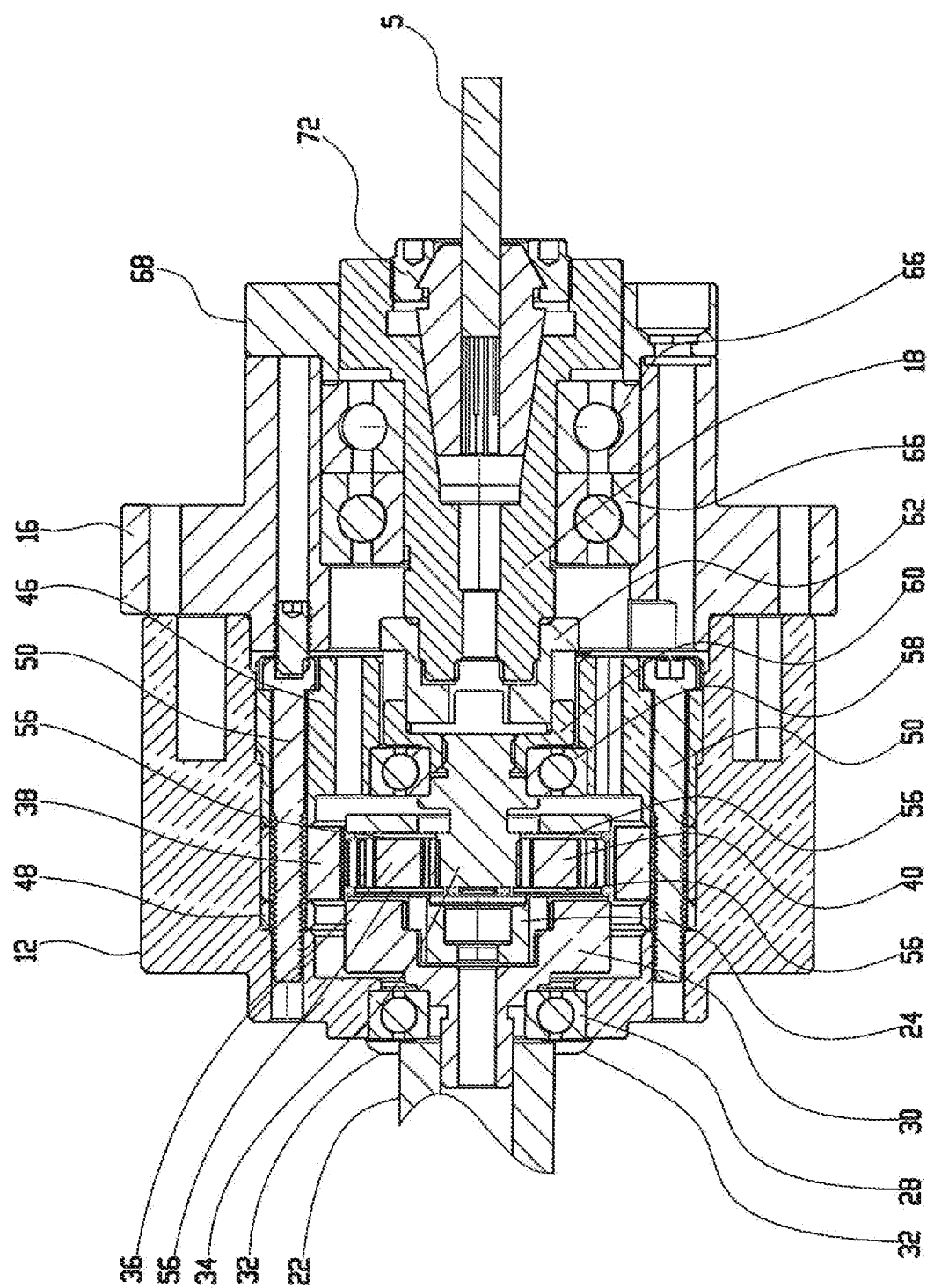
FIG. 3 is an enlarged, side elevational view partially in cross-section, of the speeder device of the present invention with the lathe and chuck not present.

DETAILED DESCRIPTION OF
REPRESENTATIVE EMBODIMENT

A representative embodiment of a CNC lathe, generally denoted by the numeral 1 in FIGS. 1 and 2, is shown in the two different views of FIGS. 1 and 2. Reference to a "lathe" hereinbelow refers to either a CNC lathe or a conventional lathe, both of which can use the speeder device, denoted in the drawing generally by the numeral 10, of the present invention to increase the speed of the workpiece. Lathe 1 includes a housing 2 containing the components necessary to operate the lathe 1, including a motor (not shown) and a spindle (not shown) operated by the motor. As with any ordinary lathe, the spindle, powered by the motor, rotates and operatively carries a lathe chuck 3, which also rotates at the same speed as the spindle, as is known in the art. The lathe chuck 3 will ordinarily hold the workpiece to be worked, wherein "worked" means that a cutting tool (not shown) is being used to cut or otherwise remove material from the workpiece to produce a product from the workpiece.

As shown in FIGS. 1 and 2, however, the lathe chuck 3 does not hold the workpiece, but rather holds and secures the speeder device 10, which may be attached to the chuck 3 by chuck jaws 4a, 4b, and 4c. Thus, generally, when the spindle (not shown) rotates, the chuck 3 also rotates, which also generally rotates the speeder device 10. It is the speeder device 10 that holds the workpiece 5 and rotates it, albeit at a different, faster speed than that spindle, chuck 3 or most of the outer portions of the speeder device 10.

Figure 4:
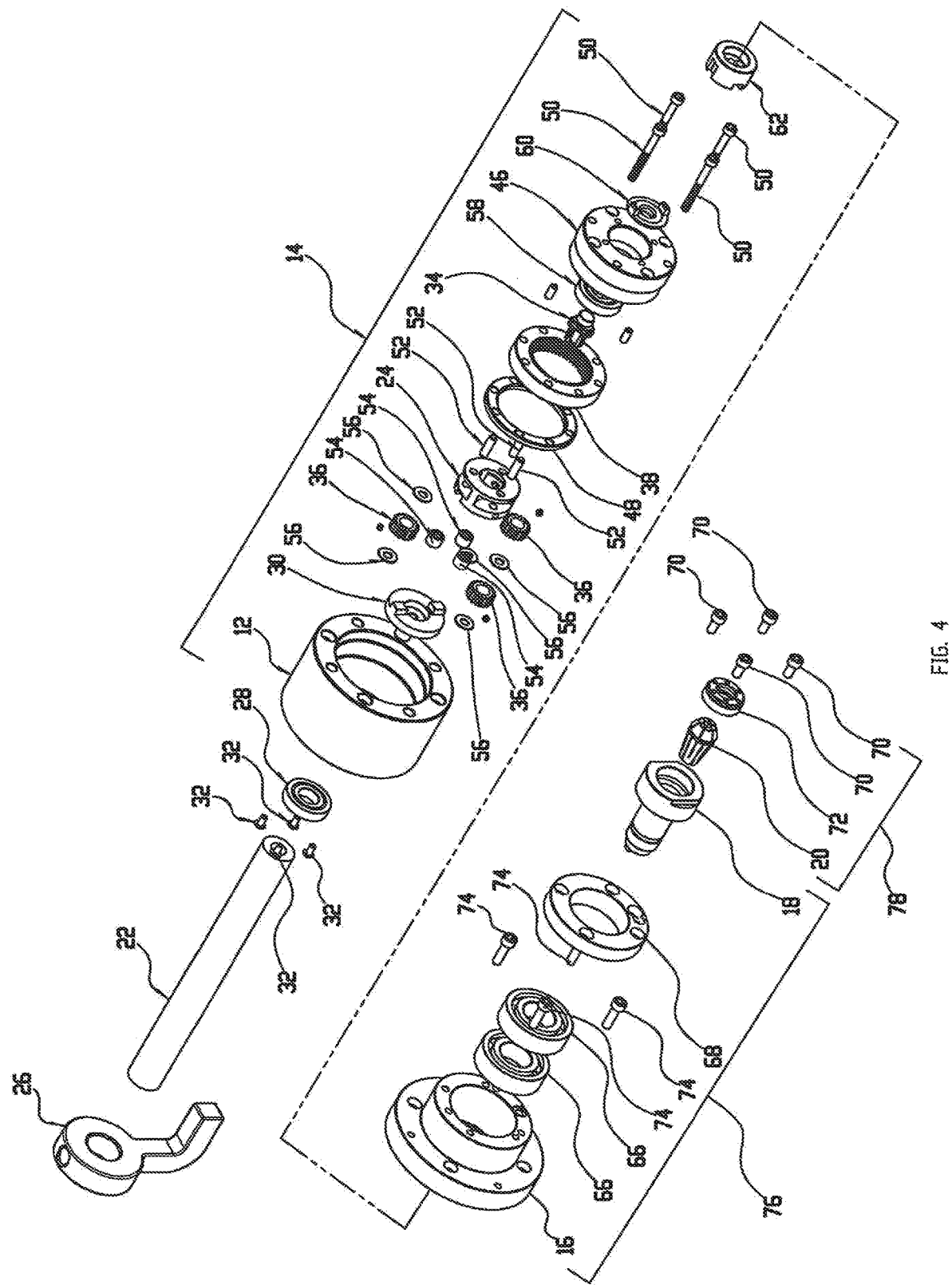
FIG. 4 is an exploded view of speeder device of FIG. 3.

With reference to FIGS. 3 and 4, one representative embodiment of the speeder device 10 of the present invention includes a gearbox housing 12 that generally houses a planetary gearset 14 and related parts, a spindle housing 16 that generally houses the output spindle 18, collet 20 and related parts, and a torque rod 22 operatively connected to a planet gear carrier 24 of the planetary gearset 14. It will be appreciated that the torque rod 22 is only partially shown in FIG. 3, and that one end of the torque rod 22 is shown in FIG. 4, and includes a torque arm 26 slidably attached to the torque rod 22. The torque arm 26 is used to prevent rotation of the torque rod and, thereby, the planet gear carrier 24. It will be appreciated that the torque arm 26 can be substituted for any means for stopping rotation of the torque rod 22 known in the art. Alternative means for stopping the rotation of the torque rod 22 may include anti-rotating clamps, which clamp around the torque rod 22 and may extend at least partially radially outward from the torque rod 22 so as to provide an element that prevents rotation of the torque rod 22.

In the present embodiment shown in FIGS. 4 and 2, the torque arm 26 is received and secured onto the torque rod 22 and extends at least partially radially from the torque rod 22 so as to provide an element that rests against a stationary element such as the lathe housing 2. As best shown in FIG. 2, one end of the torque arm 26 is secured around the torque rod 22 while the other end is bent around the lathe housing 2 in manner that prevents the torque arm from substantially moving, which, in turn, prevents the torque rod 22 from rotating, and which, in turn, prevents the planet gear carrier 24 from rotating.

At the other end of the torque rod 22 adjacent the planetary gearset 14, it will be appreciated that the torque rod 22 is attached to the planet gear carrier 24 by a rod bearing 28 and an input spider 30. The input spider connects the torque rod 22 to the planet gear carrier 24, while the rod bearing 28 is attached to the gearbox housing by bolts 32. The bolts 32 keep the rod bearing 24 in its bore created by the gearbox housing 12. The rod bearing 24 allows the gearbox to rotate around the stationary torque arm 22 in operation.

Figure 5:
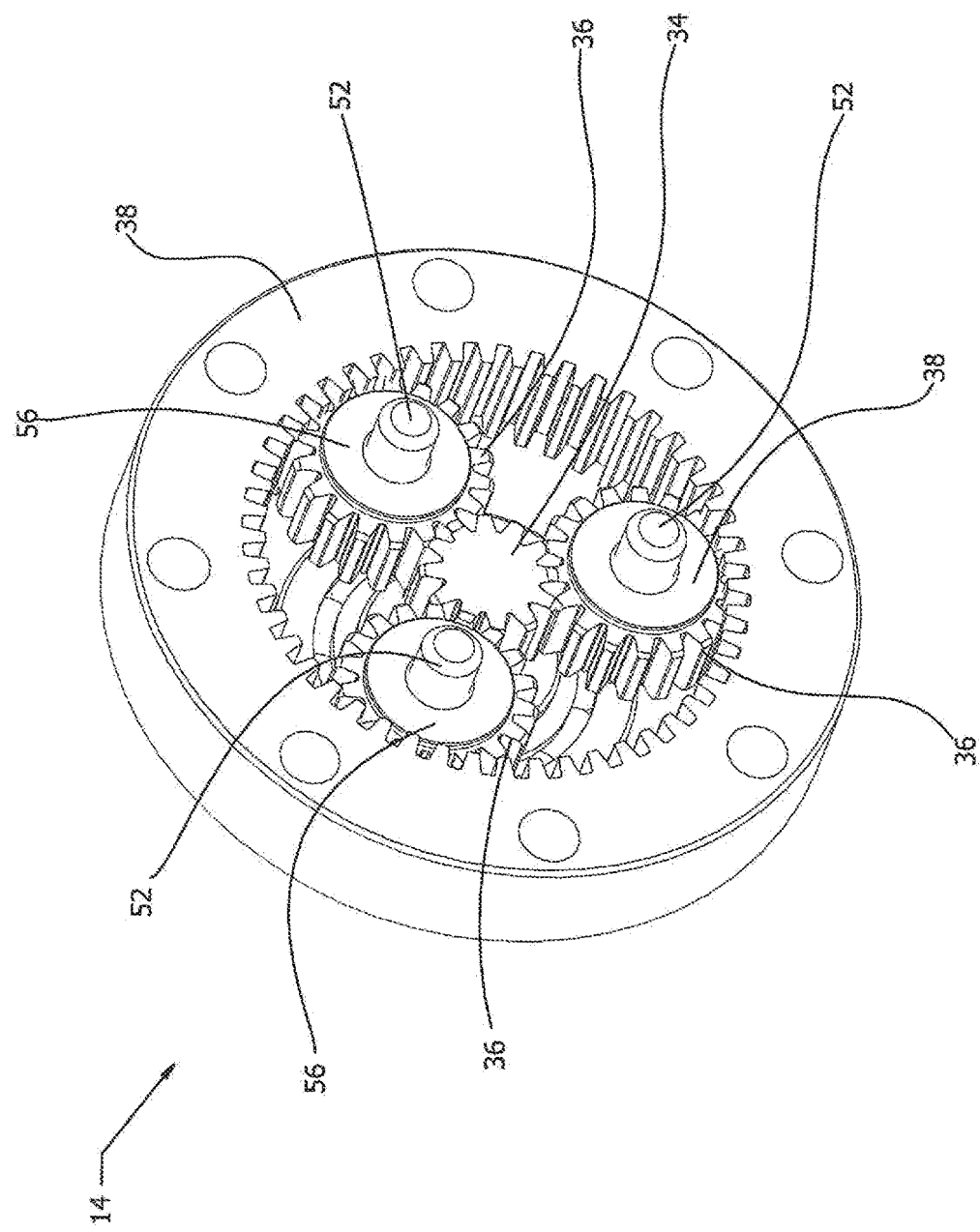
FIG. 5 is a perspective view of the planetary gearset assembly of the speeder device of the present invention.

As best shown in FIG. 5, the planetary gearset 14 generally includes a sun gear 34, a plurality of planet gears 36, and a ring gear 38. In the embodiment shown, there are 3 planet gears 34 that rotate around the sun gear 38 and within the ring gear 36. Actually, it will be appreciated that the ring gear 38 spins around the planet gears 36 and the sun gear 34 rotates within the confines of the planet gears 36. Also, any known planetary gearset meeting the necessary requirements of the present invention as claimed can be used in the speeder device 10. Accordingly, more than 3 planet gears could be included, or fewer than 3 planet gears could be included. However, there should be a plurality of planet gears 36.

Generally, as with any planetary gearset and as shown in FIG. 5, the sun gear 34 is positioned in the center of the planetary gearset 14, The sun gear 34 will have a predetermined number (N) of teeth 40. The plurality of planet gears 36, also having a plurality of teeth 42 suitable for engaging the teeth 40 of the sun gear 34. Thus, the planet gears 36 are able to revolve around the sun gear 34, or more specifically, the sun gear 34 is able to rotate within the confines of the planet gears 36. Likewise, the ring gear 38 also has a predetermined number of teeth 44, but the number of teeth 44 of the ring gear is determined by the number of teeth 40 of the sun gear 40 as explained below. The teeth 42 of the planet gears 36 should also be suitable for engaging the teeth 44 of the ring gear 38. Accordingly, the planet gears 36 should be able to rotate within the ring gear 38, or more specifically, the ring gear 38 should be able to rotate around the planet gears 36.

It will be appreciated that the ring gear 38 is attached to a ring gear carrier 46 that holds the ring gear 38 in place and keeps the ring gear 38 from turning inside the gearbox housing 12. On the other side of the ring gear 38, a ring gear spacer 48 also holds the ring gear in place. The ring gear carrier 46 and ring gear spacer 48 are attached to the ring gear 38 by ring gear bolts 50 that extend through the ring gear carrier 46, the ring gear 38, and the ring gear spacer 48 and that are received by the gearbox housing 12. Thus, it will be appreciated that the ring gear 38 rotates at the same speed as the gearbox housing 12, which rotates at the same speed as the lathe chuck 3 or lathe spindle.

With respect to the planet gears 36, it will be appreciated that each planet gear carrier 24 carries the planet gears 36, but while the planet gear carrier 24 is stationary, the planet gears still rotate. In order to rotate, each planet gear 36 includes a planet gear dowel pin 52 and a planet gear bearing 54 about which the planet gear 36 spins or rotates. A pair of planet gear washers 56 encircle the dowel pin 52 located on each side of the planet gear 36 and planet bearing 52. The washer separates the planet gears 36 from the planet gear carrier 24, acting as a bearing between the planet gears 36 and the planet gear carrier 24.

The sun gear 34 extends axially beyond the planetary gearset 14 and contacts the sun gear bearing 58, which is located between the ring gear carrier and the sun gear 34. The sun gear bearing 58 allows the sun gear 34 to rotate at a different speed than the gearbox housing 12.

Thus, it will be appreciated that the planetary gearset of the present invention is slightly different from ordinary planetary gearsets wherein the ring gear is stationary and binds the planet gears on the outside, while the planet gears rotate around axes that revolve around a sun gear, which spins in place. In that embodiment, the concentricity of the planet grouping with the sun gear and ring gear means that the torque carries through a straight line. In the present invention, the ring gear rotates at the speed of the lathe or lathe chuck, or the gearbox housing. The planet gears are essentially stationary and rotate, but do not revolve around the sun gear. Rather, the sun gear rotates within the confines of the planet gears. Depending upon the number of teeth 44 set forth in the ring gear 38 and the number of teeth 40 set forth in the sun gear 34, wherein the number of teeth 44 of the ring gear 38 is desirably greater than the number of teeth 40 in the sun gear 34, the sun gear 34 will rotate faster than the ring gear 38.

The sun gear 34 is then attached to the spindle 18 by an output spider 60 and spindle spider 62. The output spider 60 is located between the sun gear 34 and the spindle spider 62 and transfers the rotational motion and speed of the sun gear 34 to the spindle spider 62, which in turn is located between the output spider 60 and the spindle 18, and transfers the rotational motion and speed of the sun gear 34 and output spider 60 to the spindle 18. Spindle bearings 66 located in the spindle housing 16 surround the spindle 18 and allow the spindle 18 to rotate or otherwise spin at the same rate as the sun gear 34, output spider 60 and spindle spider 62, while the spindle spider 16, which is connected to the gearbox housing 12, rotates at the same rate or speed as the gearbox housing 12. A spindle bearings cap 68 keeps the spindle bearings 66 contained in the bore located in the spindle housing 16. The spindle bearings cap 68 is held in place by cap bolts 70, which fasten the spindle bearings cap to the spindle housing 16.

Within the spindle 18 is a collet 20 for holding a workpiece 5. The collet 20 is held in place by a collet nut 72, which also tightens the collet 20 around the workpiece 5.

Finally, the gearbox housing 12 and spindle housing 16 may be attached by spindle housing bolts 74.

In operation, it will be appreciated that the speeder device 10 can provide for an increase in the speed of rotation of the workpiece that is faster than the speed of rotation of the lathe 1 itself. This is because the sun gear 34 in the speed device of the present invention can be made to rotate at a speed several times faster that the speed of the ring gear 38 which rotates at the same speed as the lathe 1.

More particularly, the actual increase in the speed of the workpiece over that of the lathe is based upon the number ($N_R$) of teeth 44 in the ring gear 38 divided by the number ($N_S$) of teeth 40 in the sun gear 34 times the number of revolutions per minute (RPM) of the lathe. Thus, where the ring gear 38 has two, three or four times more teeth than the sun gear 34, the speed of the workpiece will increase by two, three, or four times, respectively, the rate of speed of the lathe. However, to calculate the actual speed of the workpiece (i.e., not the actual increase in the speed of the workpiece), the calculation must add 1 to the quotient before multiplying by the number of revolutions per minute (RPMs) of the lathe to accommodate the fact that the lathe is spinning, and for every rotation of the lathe, the workpiece is spinning as well. Where an "increase in (rotational) speed of a workpiece" is referred to, it is meant that, when the speeder device 10 of the present invention is used, the rotational speed of a workpiece 5 is increased as compared to the rotational speed of a lathe 1. This should not be confused with "the (rotational) speed of the workpiece" which refer to the actual rotational speed of the workpiece itself.

The calculation for the increase in the speed of the workpiece can be shown by the formula (I):

$$\frac{\text{Number of teeth of ring gear}(N_R)}{\text{Number of teeth of sun gear}(N_S)} \times \text{Number of } RPMs \text{ of lathe} = \quad (I)$$

Increase in speed of the workpiece

The calculation for the speed of the workpiece can be shown by the formula (II):

$$\frac{(\text{Number of teeth of ring gear }(NR)+1)}{\text{Number of teeth of sun gear }(NS)} \times \quad (II)$$

Number of *RPMs* of lathe = Speed of workpiece

Generally, it is envisioned that the ring gear 38 should have at least twice the number of teeth as the sun gear. This would increase the speed of the workpiece to be at least twice as fast as before.

For example, where the number ($N_R$) of teeth of the ring gear is 60, (i.e., $N_R$32 60), and the number of teeth of the sun gear is 20 ($N_S$=20), and the lathe is shown to rotate at 3000 RPMs, then the speed at which the workpiece will rotate would be 12,000 RPMs, as $N_R/N_S$ would be 3, plus 1 would be 4 and times 3000 RPM would be 12,000 RPM.

Similarly, where the number ($N_R$) of teeth of the ring gear is 40 (i.e., $N_R$32 40) and the number ($N_S$) of teeth of the sun gear is 10 (i.e., $N_S$32 10), and the lathe is shown to rotate at 2000 RPMs, then the speed of the workpiece will rotate at RPMs, as $N_R/N_S$ would be 4, plus 1 for the spinning of the lathe, which would be 5 time 2000 RPMs would be 10,000 RPMs.

Thus, it will be appreciated that, in the present invention, the predetermined number of teeth 40 and 44 of the sun gear 34 and ring gear 38, respectively, dictates the speed of the rotation of the sun gear 34 and consequently, the speed of the workpiece 5.

Put another way, the specific mathematical relationship of the number of ring gear teeth divided by the number of sun gear teeth+1 would be the gear rate. The gear rate is determined by figuring out a gear ratio between the number of ring gear teeth and the number of sun gear teeth, and then adding 1 to account for the initial rotation of the lathe/ring gear that has also occurred.

For example, if the RPM of the lathe/ring gear is 2,000 RPM, the number of ring gear teeth ($N_R$) is 60, and the number of sun gear teeth ($N_S$) is 20, then the gear rate will be 4 [(60 $N_R$/20 $N_S$)+1 =4]. This means that the RPM of the sun gear 34 and ultimately the workpiece 5 will be 8,000 RPM (2,000 RPM of sun gear times a gear rate of 4=8,000 RPM). In another example, if the RPM of the ring gear is 2,000 RPM, the number of ring gear teeth ($N_R$) is 80, and the number of sun gear teeth ($N_S$) is 20, then the gear rate will be 5 [(80 $N_R$/20 $N_S$)+1=5]. Then, this means that the RPM of the sun gear and ultimately the workpiece 5 will be 10,000 RPM (2,000 RPM of sun gear times a gear rate of 5=10.000 RPM). In yet another example, if the RPM of the ring gear is 2,000 RPM, the number of ring gear teeth ($N_R$) is 40, and the number of sun gear teeth ($N_S$) is 20, then the gear rate will be 3 [(40 $N_R$/20 $N_S$)+1=3]. Then, this means that the RPM of the sun gear and ultimately the workpiece 5 will be 6,000 RPM (2,000 RPM of sun gear times a gear rate of 3=6,000 RPM).

In an alternative embodiment, it will be appreciated that the speeder device 10 can be operatively secured directly to the spindle of lathe 1 and operate the same way on the lathe with respect to increasing the speed of the workpiece in the speed device on the lathe. Essentially, the gearbox housing 12 of the speeder device 10 would become the chuck and rotate at the same RPM as the spindle of lathe 1. Operative connection of the speeder device 10 with the spindle of lathe 1 without the need for lathe chuck 3 would be well understood by one of ordinary skill in the art. In that case, when the spindle of lathe 1 is in use, the gearbox housing 12 of the speeder device 10 rotates according to the RPM of the spindle of lathe 1.

Thus, it should be evident that, in operation, the lathe may be operated at an RPM that defines a lathe RPM. The ring gear rotates at the lathe RPM, while the sun gear rotates at an RPM to define a sun gear RPM. The sun gear RPM is faster than the lathe RPM by a gear rate, wherein the gear rate is determined by the number of teeth of the ring gear divided by the number of teeth of the sun gear plus 1, and wherein the sun gear is operatively connected to the workpiece such that the speed of the workpiece will be increased to the sun gear RPM.

The purpose of the speeder device 10 of the present invention is to rotate a workpiece 5 at an RPM that is faster than the RPM of the spindle of the lathe. The speeder device 10 includes a gearbox housing 12 that will rotate at the same speed as the lathe 1. A torque rod 22 and means for stopping rotation of torque rod 22 are provided and attached to the planetary gearset 14 by way of the planet gear carrier 24. The planetary gearset 14 includes a plurality of planet gears 36 each having a plurality of teeth 42, a sun gear 34 having a number of teeth 40 identified by the numeral NS, wherein NS is an integer between 8 and 50, and a ring gear 38 having more teeth 44, denoted as NR. such that the speeder device will rotate the workpiece 5 faster than the spindle of the lathe 1 to lather chuck 3 will rotate. The speeder device 10 also includes a spindle housing 16 encasing a spindle 18 and a collet 20, wherein the collet 20 holds the workpiece 5.

It should also be evident that any CNC lathe can be used in the present invention. Moreover, CNC lathes that include a motor that drives the spindle of the CNC lathe can be used and are particularly suited for this invention. Therefore, it should be understood that any spindle rotated by a motor within the CNC lathe can be used. As the present invention is not directed to that part of the lathe 1, it is believed that judicial notice can be taken as to the operation of the motor and spindle on a CNC lathe.

Instead, the present invention is directed to the speeder device 10 that operates to rotate a workpiece 5 at an RPM faster than the operating RPM of the spindle of the lathe. When the spindle of a lathe is turned on, through the connections discussed above, the gearbox housing 11 will rotate at the same RPM as the spindle. In turn, the gearbox housing 11 will rotate the ring gear 38 at the same RPM as the spindle based on the ring gear 38 being connected to the gearbox housing 12 through the ring gear bolts 50. Then, through the interactions of the teeth 44 of the ring gear 38 and the teeth 42 of each of the planet gears 36, the planet gears 36 will rotate. And, through the interactions of the teeth 42 of each of the planet gears 36 and the teeth 40 of sun gear 34, the sun gear 34 will rotate, albeit at a faster RPM than the ring gear 38. Hence, because the sun gear 34 rotates faster the workpiece will rotate faster.

The planetary gearset 14 is operatively connected to the workpiece 5 through the sun gear 34 to an output spindle assembly 76 and a collet assembly 78. Specifically, the planetary gearset 14 further includes an output spider 60 that is secured to both the sun gear 34 and a spindle spider 62 of the output spindle assembly 18 in order to transmit the rotation of the sun gear 34 to the spindle spider 62 of the output spindle assembly 76.

In addition to the spindle 18, output spindle assembly 76 includes the spindle housing 16, a pair of spindle bearings 66, a spindle bearing cap 68, spindle housing cap bolts 70, and spindle housing bolts 74. The spindle 18 also sits within the spindle housing 16 and holds the collet 20 of the collet assembly 78.

In addition to the collet 20, the collet assembly 78 also includes the collet nut 72. Wherein the collet 20 holds the workpiece 5, the collet nut 72 is utilized to tighten the collet 20 around the workpiece 5. In one or more embodiments, collet 20 is an ER collet.

Therefore, it should now be clear that the sun gear 34 of the planetary gearset 14 is connected to an output spider 60, which is connected to a spindle spider 62 of the output spindle assembly 76, which is connected to a spindle 18 of the output spindle assembly 76, which is connected to a collet 20 of the collet assembly 78, and wherein the collet 20 is used to hold the workpiece 5. Importantly, the RPM of the sun gear 34 will match the RPM of the collet 20 which holds the workpiece 5. Hence the speed of the workpiece 5 will be the same as the speed of the rotation of the sun gear 34.

In light of the foregoing, it should be appreciated that the present invention significantly advances the art by providing a speeder device for increasing the speed of a workpiece that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is clamed is:

1. A speeder device for use on a lathe for increasing the speed of a workpiece, wherein the speeder device comprises:
   a. a torque rod;
   b. a means for stopping rotation of said torque rod secured first end of said torque rod;
   c. a planetary gearset operatively connected to a second and of said torque rod wherein said planetary gearset includes;
      i. a plurality of planet gears wherein each planet gear of the plurality of planet gears has a plurality of teeth;
      ii. a sun gear having N number of teeth, wherein N is a integer between 8 and 50; and
      iii. a ring gear having at least twice the number of teeth of the sun gear, wherein the plurality of teeth of each planet gear of the plurality of planet gears are in contact with the teeth of the sun gear and the teeth of the ring gear;
   d. an output spindle assembly operatively connected to the planetary gearset;
   e. and a collet assembly operatively connected to the spindle assembly, wherein the collet assembly holds the workpiece within the speeder device.

2. The device of claim 1, wherein the means for stopping rotation of said torque rod is a torque arm.

3. The device of claim 1, wherein the planetary gearset is contained within a gearbox housing.

4. The device of claim 3, wherein the planetary gearset further includes a planet gear carrier wherein the planet gear carrier carries the plurality of planet gears and is operatively connected to the torque rod.

5. The device of claim 4, wherein the planetary gearset further includes an input spider in operative connection with the planet gear carrier and to a rod bearing secured to the second end of the torque rod such that the planet gear carrier is operatively connected to the torque rod.

6. The device of claim 5, wherein the planetary gearset further includes a ring gear carrier wherein the ring gear carrier carries the ring gear and is secured to the gearbox housing such that one rotation of the gearbox housing causes one rotation of the ring gear carried by the ring gear carrier.

7. The device of claim 6, wherein the planetary gearset further includes a sun gear bearing wherein the sun gear bearing separates the sun gear from the ring gear carrier.

8. The device of claim 7, wherein the output spindle assembly includes the spindle assembly, a pair of spindle bearings, a spindle bearing cap and an output spindle.

9. The device of claim 8, wherein the spindle housing is secured to the gearbox housing, the spindle bearings sit within the spindle housing, the spindle bearing cap is secured to the spindle housing, wherein the spindle bearings permit the output spindle within the spindle housing to rotate faster that the gearbox housing of the speeder device.

10. The device of claim 9, wherein the collet assembly includes a collet and a collet nut, wherein the spindle carries the collet, wherein the collet holds the workpiece, and wherein the collet nut is used to tighten or loosen the collet around the workpiece.

11. The device of claim 10, wherein the planetary gear assembly further includes an output spider secured to the sun gear, wherein the output spindle assembly further includes a spindle spider operatively connected to the spindle, and wherein the output spider is connected to the spindle spider in order to transmit the rotation of the sun gear to the spindle.

12. The device of claim 1, further comprising a lathe chuck secured to the lathe and wherein the speeder device is connected to the lathe chuck through the use of chuck jaws.

13. A method to increase the speed in revolutions per minute (RPM) of a workpiece to be worked on by a lathe, the method comprising the steps of:
   a. operatively securing a speeder device to the lathe, the speeder device comprising:
      i. a planetary gearset assembly, wherein the planetary gearset includes:
         1. a plurality of planet gears wherein each planet gear of the plurality of planet gears has a plurality of teeth;
         2. a sun gear having N number of teeth, wherein N is an integer between 8 and 50; and
         3. a ring gear having at least twice the number of teeth, wherein the plurality of teeth of each planet gear of the plurality of planet gears are in contact with the teeth of the sun gear and the teeth of the ring gear
      ii. a spindle assembly operatively connected to the planetary gearset assembly;
      iii. and a collet assembly operatively connected to the spindle assembly;
   b. securing the workpiece to the collet assembly;
   c. operating the lathe at an RPM to define a lathe RPM, wherein the ring gear rotates at the lathe RPM, wherein the sun gear rotates at an RPM to define a sun gear RPM, wherein the sun gear RPM is faster than the lathe RPM by a gear rate, wherein the gear rate is determined by the number of teeth of the ring gear divided by the number of teeth of the sun gear plus 1, and wherein the sun gear is operatively connected to the workpiece such that the speed of the workpiece will be increased to the sun gear RPM.

14. The method of claim 13, wherein the step of operatively securing the speeder device further includes the step of operatively securing a lathe chuck to the lathe and then operatively securing the speeder device to the lathe chuck.

15. The method of claim 14, wherein the step of operatively securing the speeder device further includes the steps of securing one end of a torque rod to the speed device; and inserting the torque rod through the lathe and securing means for stopping rotation of the torque rod to an other end of the torque rod.

* * * * *